United States Patent
Katayama et al.

(10) Patent No.: US 8,452,510 B1
(45) Date of Patent: May 28, 2013

(54) PUMPING BRAKE DETECTION AND CONTROL DEVICE AND METHOD FOR INTERNAL COMBUSTION ENGINE

(75) Inventors: Akiyoshi Katayama, Kobe (JP); Takashi Matsumoto, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/467,658

(22) Filed: May 9, 2012

(30) Foreign Application Priority Data

Nov. 17, 2011  (JP) ................. 2011-251242

(51) Int. Cl.
*G06F 19/00* (2011.01)
(52) U.S. Cl.
USPC .......... 701/70; 123/90.15; 123/295; 123/321; 123/377; 123/436; 303/10; 303/113.2; 303/113.4; 303/114.3; 303/116.2; 417/470; 417/536; 417/540; 417/555.1; 477/206; 60/453
(58) Field of Classification Search
USPC ................ 701/70; 123/90.15, 295, 321, 377, 123/436, 446; 303/10, 113.2, 113.4, 114.3, 303/116.2, 115.4, 116.1, 119.1; 417/470, 417/536, 540, 555.1; 477/206; 60/453
See application file for complete search history.

(56) References Cited

U.S. PATENT DOCUMENTS

| | | | | |
|---|---|---|---|---|
| 5,614,666 A * | 3/1997 | Hara et al. | ............. | 73/114.25 |
| 5,878,365 A * | 3/1999 | Onogi et al. | ............. | 701/70 |
| 5,947,221 A * | 9/1999 | Taniguchi et al. | ............. | 180/197 |
| 6,179,396 B1 * | 1/2001 | Fukami et al. | ............. | 303/155 |
| 6,223,716 B1 * | 5/2001 | Kadota | ............. | 123/295 |
| 6,398,316 B1 * | 6/2002 | Mizutani et al. | ............. | 303/114.3 |
| 6,412,883 B1 * | 7/2002 | Mizutani et al. | ............. | 303/114.3 |
| 6,612,660 B2 * | 9/2003 | Mizutani et al. | ............. | 303/114.3 |
| 6,666,530 B2 * | 12/2003 | Mizutani et al. | ............. | 303/114.3 |
| 6,732,504 B2 * | 5/2004 | Majima et al. | ............. | 60/284 |
| 6,735,511 B2 * | 5/2004 | Nakamura et al. | ............. | 701/70 |
| 7,167,783 B2 * | 1/2007 | Park et al. | ............. | 701/22 |
| 7,284,367 B2 * | 10/2007 | Hasegawa et al. | ............. | 60/284 |
| 7,295,918 B2 * | 11/2007 | Nada | ............. | 701/116 |
| 7,409,283 B2 * | 8/2008 | Yasui | ............. | 701/106 |
| 7,533,944 B2 * | 5/2009 | Mizutani et al. | ............. | 303/113.4 |
| 7,603,848 B2 * | 10/2009 | Majima | ............. | 60/285 |
| 7,650,221 B2 * | 1/2010 | Oi et al. | ............. | 701/103 |
| 8,312,861 B2 * | 11/2012 | Ott et al. | ............. | 123/321 |

FOREIGN PATENT DOCUMENTS

JP  2000-110606 A  4/2000

* cited by examiner

*Primary Examiner* — McDieunel Marc
(74) *Attorney, Agent, or Firm* — Sughrue Mion, PLLC

(57) ABSTRACT

A device includes: actual-intake-pipe-pressure detection unit (11); estimated-intake-pipe-pressure detection unit (12) for calculating an estimated intake pipe pressure based on a rotation speed of the engine and an opening degree of a throttle valve; pressure difference calculation unit (13) for calculating a pressure difference between the actual and estimated intake pipe pressures; pressure difference integration unit (14) for integrating the pressure difference with respect to time; pumping brake detection unit (15) for determining that a pumping brake operation is performed when a integral value is equal to or more than a first determination value; and throttle valve control unit (16) for carrying out control for the pumping brake during the pumping brake operation based on a result of the determination by the pumping brake detection unit (15), and carrying out ordinary control otherwise.

3 Claims, 6 Drawing Sheets

PUMPING BRAKE DETECTION AND CONTROL DEVICE AND METHOD FOR INTERNAL COMBUSTION ENGINE

BACKGROUND OF THE INVENTION

1. Field of the Invention

The present invention relates to a pumping brake detection and control device and method for detecting a pumping brake operation, and more particularly, to a pumping brake detection and control device and method for an internal combustion engine.

2. Description of the Related Art

A vehicle is generally provided with a brake booster for assisting an operation force applied by a driver to depress a brake pedal. An intake pipe for introducing the air is provided for an internal combustion engine, and a negative pressure (as used herein, pressure lower than the atmospheric pressure) is generated in the intake pipe when the air is introduced into a combustion chamber of the internal combustion engine therethrough. The brake booster uses the negative pressure generated in the intake pipe as a power source. The negative pressure is led to the brake booster via a brake pressure feeding pipe which branches from the intake pipe at the downstream side of the throttle valve. An adjusting valve which is operated by the air pressure in the brake booster is provided. When the driver depresses the brake pedal, the adjusting valve is operated by the negative pressure corresponding to a depression quantity of the brake pedal to assist the depressing operation force applied to the brake.

The negative pressure is secured by closing the throttle valve in order to drive the brake booster. However, when a pumping brake operation in which the driver repeats an operation of stepping on the brake is performed, the air is introduced from the brake booster to the intake pipe, the pressure inside the intake pipe changes to the atmospheric pressure, and it is hard to secure the negative pressure required for driving the brake booster. Therefore, the brake booster no longer assists the depressing operation force on the brake, and the driver feels discomfort. Note that, the pumping brake operation is one of driving techniques of the driver, and at the time of driving on a frozen road surface or a snowy road, repeats an action in which the brake pedal is gradually depressed without fully depressing the brake pedal at once, and the brake pedal is slightly released when wheels start slipping, and the brake pedal is stepped on again. By performing the pumping brake operation, the braking distance during the braking can be minimized by preventing the wheels from being locked.

As a method for detecting the pumping brake operation, for example, in a negative pressure control device for a vehicular internal combustion engine according to Japanese Patent Application Laid-open No. 2000-110606, whether the pumping brake operation is being carried out or not is detected based on a period from a braking operation to a next braking operation.

An on/off state of a brake switch is determined based on the depression quantity of the brake pedal according to Japanese Patent Application Laid-open No. 2000-110606. In other words, if the depression quantity of the brake pedal is "0", it is determined that the brake switch is off, and if the depression quantity of the brake pedal is other than "0", it is determined that the brake switch is on. However, the brake switch generally chatters. For example, the brake switch chatters due to a vibration of a brake pedal when the brake pedal is released in the brake operation. As a result, whether the brake switch is on or off is erroneously determined, and as a result, it is erroneously determined that the driver is carrying out the pumping brake operation. Therefore, a control generally provides hysteresis for the determination regarding the brake switch.

However, if the hysteresis is provided, even when the brake switch is turned off from on (or conversely on from off), the turning on/off of the brake switch is neglected due to the hysteresis, and the pumping brake operation may not be detected. As a result, the air is introduced from the brake booster to the intake pipe, the pressure inside the intake pipe changes to the atmospheric pressure, and it is thus difficult to maintain the negative pressure required to drive the brake booster.

SUMMARY OF THE INVENTION

The present invention has been made in order to solve the above-mentioned problem, and therefore has an object to provide a pumping brake detection and control device and method for an internal combustion engine, for detecting whether any braking operation is a pumping brake operation or not, thereby securing a negative pressure required for driving a brake booster.

According to the present invention, there is provided a pumping brake detection and control device for an internal combustion engine including: actual-intake-pipe-pressure detection means for detecting an actual intake pipe pressure of an intake pipe for supplying an internal combustion engine with the air based on a detected value detected by an intake pipe pressure sensor; estimated-intake-pipe-pressure detection means for calculating an estimated intake pipe pressure based on a rotation speed (number of revolution, or rotation per minutes (rpm)) and an opening degree of a throttle valve of the internal combustion engine; pressure difference detection means for detecting a pressure difference between the actual intake pipe pressure detected by the actual-intake-pipe-pressure detection means and the estimated intake pipe pressure calculated by the estimated-intake-pipe-pressure detection means; pressure difference integration means for integrating the pressure difference calculated by the pressure difference calculation means with respect to time; pumping brake detection means for determining that a brake operation by a driver is a pumping brake operation if the value of integral calculated by the pressure difference integration means is equal to or more than a first determination value set in advance; and throttle valve control means for providing a throttle valve provided in the intake pipe with control for the pumping brake period during the pumping brake operation based on a determination result by the pumping brake detection means, and providing ordinary control otherwise.

A pumping brake detection and control device for an internal combustion engine including: actual-intake-pipe-pressure detection means for detecting an actual intake pipe pressure of an intake pipe for supplying an internal combustion engine with the air based on a detected value detected by an intake pipe pressure sensor; estimated-intake-pipe-pressure detection means for calculating an estimated intake pipe pressure based on a rotation speed and an opening degree of a throttle valve of the internal combustion engine; pressure difference detection means for detecting a pressure difference between the actual intake pipe pressure detected by the actual-intake-pipe-pressure detection means and the estimated intake pipe pressure calculated by the estimated-intake-pipe-pressure detection means; pressure difference integration means for integrating the pressure difference calculated by the pressure difference calculation means with respect to time; pumping brake detection means for determining that a brake operation by a driver is a pumping brake operation if the value of integral calculated by the pressure difference integration means is equal to or more than a first determination value set in advance; and throttle valve control means for providing a throttle valve provided in the intake pipe with control for the pumping brake period during the pumping brake operation based on a determination result by the pumping brake detection means, and providing ordinary control otherwise. The present invention has been made in view of the above-mentioned problem, and therefore has an object to provide pumping brake detection and control device and method for an internal combustion engine for detecting whether any braking operation is a pumping brake operation or not, thereby securing a negative pressure required for driving a brake booster.

DETAILED DESCRIPTION OF THE PREFERRED EMBODIMENTS

First Embodiment

Figure 1:
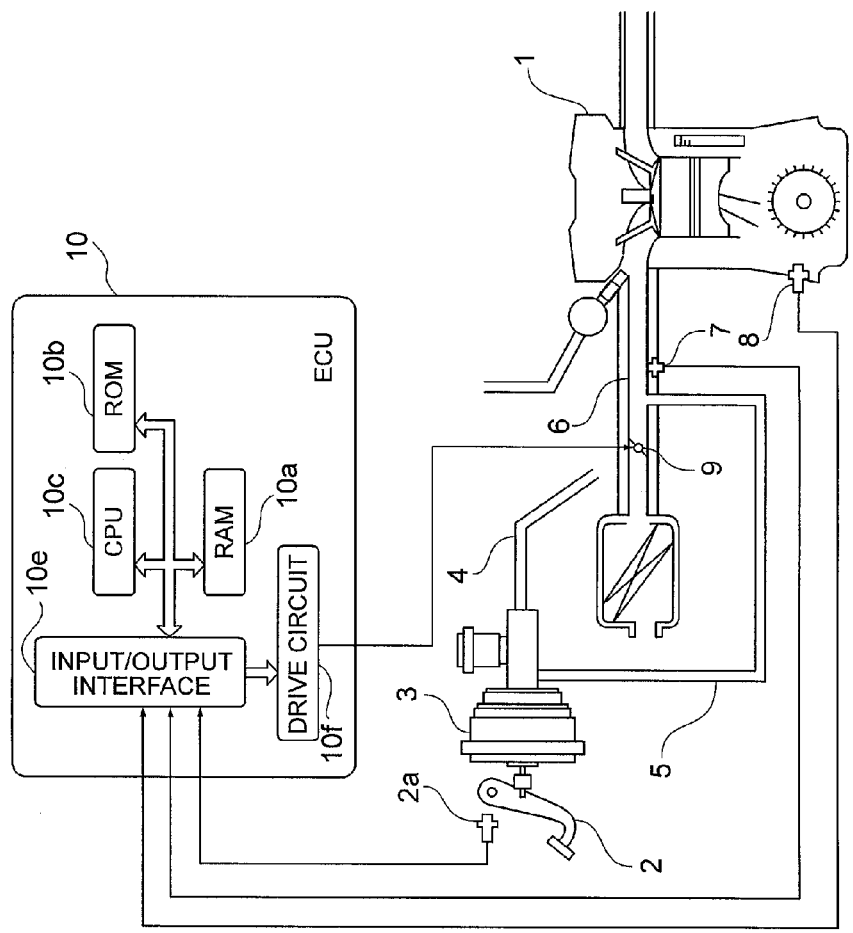
FIG. 1 is a configuration diagram illustrating a configuration of a vehicle provided with a pumping brake detection and control device for an internal combustion engine according to a first embodiment of the present invention.

FIG. 1 is a diagram illustrating a configuration of a vehicle provided with a pumping brake detection and control device for an internal combustion engine according to a first embodiment of the present invention. Reference numeral 1 denotes an internal combustion engine in FIG. 1. Reference numeral 8 denotes a rotation speed sensor for detecting a rotation speed of the internal combustion engine 1. The rotation speed sensor 8 transmits a signal corresponding to the detected rotation speed to an ECU 10. Reference numeral 6 denotes an intake pipe for supplying the air to a combustion chamber of the internal combustion engine 1. Reference numeral 7 denotes an intake pipe pressure sensor for detecting the pressure in the intake pipe 6, thereby detecting an air quantity flowing through the intake pipe 6. The intake pipe pressure sensor 7 transmits a signal corresponding to the detected pressure in the intake pipe 6 to the ECU 10. Reference numeral 9 is a throttle valve for adjusting the air quantity flowing through the intake pipe 6.

The ECU 10 receives the information of the rotation speed of the internal combustion engine 1 and the like on an input/output interface 10e, thereby calculating a fuel quantity required for the internal combustion engine 1, and controlling the throttle valve 9 and the like via a drive circuit 10f. The ECU 10 includes a read/write memory (RAM) 10a for recording/updating information from various sensors, and a controlled state of the internal combustion engine 1 at any time, a read-only memory (ROM) 10b for storing various control programs and control information, and a central processing unit (CPU) 10c for carrying out various arithmetic operations and various types of control according to the control programs stored in the ROM 10b.

Note that, the pumping brake detection and control device for an internal combustion engine according to the first embodiment is constructed by the ECU 10.

A brake pressure feeding pipe 5, which is a branch of the intake pipe 6, is provided downstream of the throttle valve 9 in the intake pipe 6 as illustrated in FIG. 1. The brake pressure feeding pipe 5 is connected to a brake booster 3. The brake booster 3 reduces an operation force exerted by a driver carrying out a depressing operation on the brake pedal 2. The brake booster 3 drives a brake hydraulic pressure line 4 connected to the brake booster 3 using a negative pressure generated in the intake pipe 6 when the internal combustion engine 1 is running. The brake operation force of the driver and the negative pressure are converted into a hydraulic pressure by the brake booster 3, and the hydraulic pressure is transmitted in this way to the service brakes of each wheel through the brake hydraulic line 4.

Figure 2:
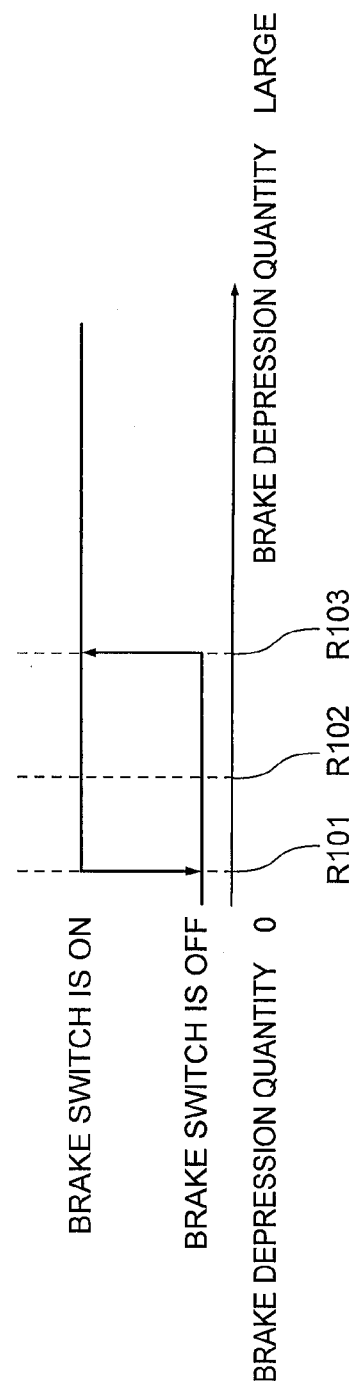
FIG. 2 is a characteristic diagram illustrating a state of a brake switch with respect to a brake depression quantity of the pumping brake detection and control device for an internal combustion engine according to the first embodiment of the present invention.

A brake switch 2a for detecting a depressing operation on the brake pedal 2 is provided on the brake pedal 2, and is switched on/off according to the depression quantity of the brake pedal 2. The brake switch 2a inputs a signal indicating the on/off state to the ECU 10 via the input/output interface 10e. FIG. 2 is a characteristic diagram illustrating a relationship between the brake depression quantity and the on/off state of the brake switch 2a. In an example illustrated in FIG. 2, when the driver depresses the brake pedal 2, and the brake depression quantity exceeds R103, it is determined that the brake switch 2a is turned on. Then, when the driver reduces the depression force applied on the brake pedal 2, and the brake depression quantity decreases to R102, the determination for the brake switch 2a remains in the on state. Then, when the driver further reduces the depression force applied on the brake pedal 2, and the brake depression quantity decreases to R101 or lower, the determination for the brake switch 2a changes to the off state.

Figure 6:
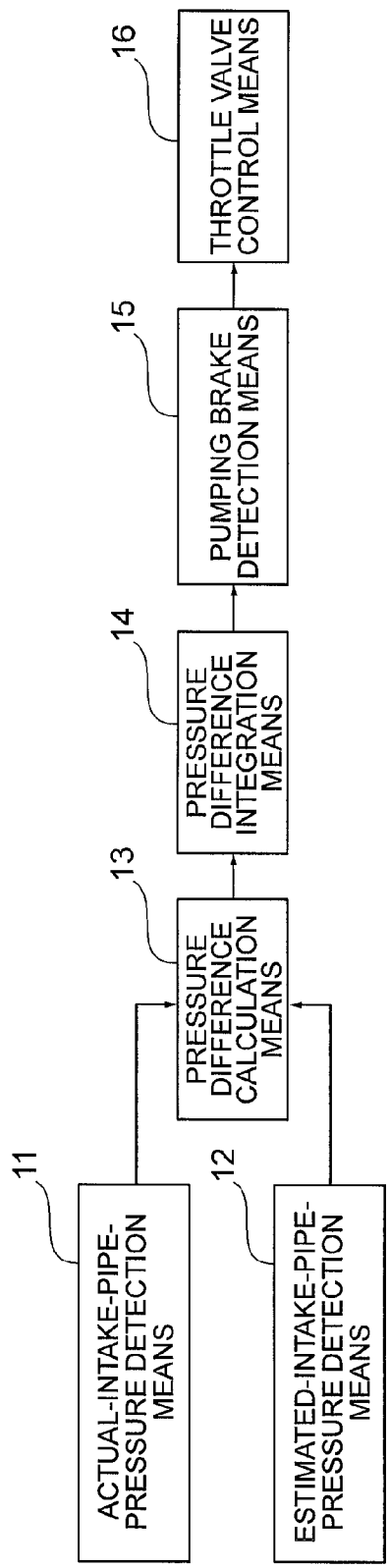
FIG. 6 is a configuration diagram illustrating an inventive configuration of the pumping brake detection and control device for an internal combustion engine according to the first embodiment of the present invention.

FIG. 6 is a diagram illustrating a configuration of the pumping brake detection and control device for an internal combustion engine according to the first embodiment of the present invention. As illustrated in FIG. 6, the pumping brake detection and control device for an internal combustion engine includes actual-intake-pipe-pressure detection means 11, estimated-intake-pipe-pressure detection means 12, pressure difference calculation means 13, pressure difference integration means 14, pumping brake detection means 15, and throttle valve control means 16.

The actual-intake-pipe-pressure detection means 11 detects the actual pressure in the intake pipe 6 based on the measured value (detected value) of the intake pipe pressure sensor 7.

The estimated-intake-pipe-pressure detection means 12 calculates an estimated value of the pressure in the intake pipe 6 based on the rotation speed of the internal combustion engine 1 detected by the rotation speed sensor 8 and the opening degree of the throttle valve 9 detected by a throttle position sensor (not shown) provided to the throttle valve 9.

The pressure difference calculation means 13 calculates a difference (pressure difference) between the value of the actual pressure detected by the actual-intake-pipe-pressure detection means 11 and the estimated value calculated by the estimated-intake-pipe-pressure detection means 12.

The pressure difference integration means 14 integrates the pressure difference calculated by the pressure difference calculation means 13 with respect to time.

The pumping brake detection means 15 determines presence/absence of the pumping brake operation based on the value of integral acquired by the pressure difference integration means 14. In other words, the pumping brake detection means 15 compares the value of integral with a predetermined determination value (threshold) set in advance, and determines that the pumping brake operation is being carried out if the value of integral is equal to or more than the determination value.

The throttle valve control means 16 controls the throttle valve 9 based on the determination result by the pumping brake detection means 15. In other words, the throttle valve control means 16 carries out ordinary throttle valve control if the pumping brake detection means 15 determines that the pumping brake operation is not being carried out. On the other hand, the throttle valve control means 16 carries out throttle valve control for a pumping brake period if the pumping brake detection means 15 determines that the pumping brake operation is being carried out.

Figure 3:
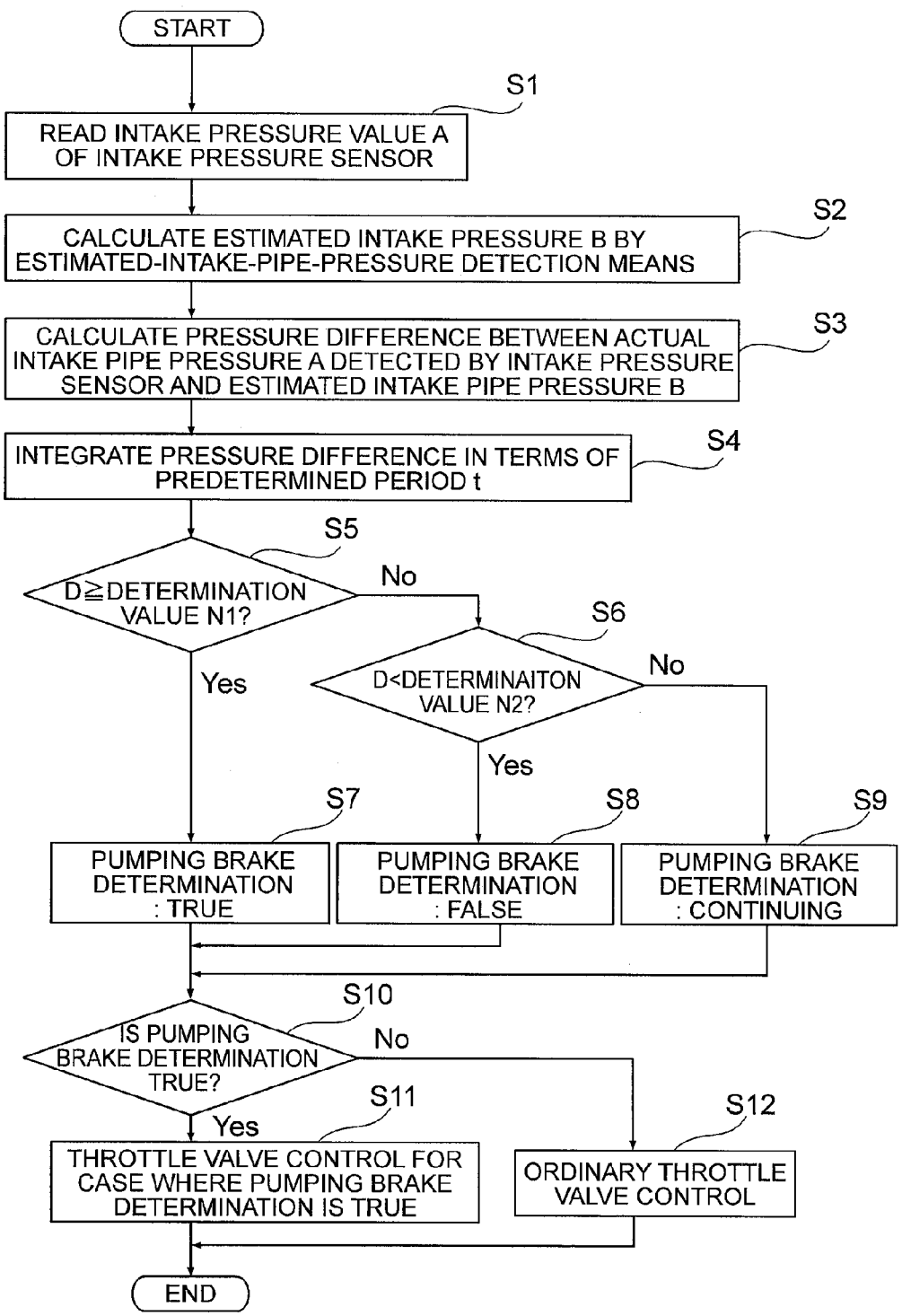
FIG. 3 is a flowchart illustrating a processing sequence of the pumping brake detection and control device for an internal combustion engine according to the first embodiment of the present invention.

FIG. 3 is a flowchart illustrating a processing sequence of the pumping brake detection and control device for an internal combustion engine according to the first embodiment of the present invention. This processing is one piece of processing within a main routine, and is repeated after a key switch serving as a power supply switch (not shown) is turned on. When the key switch is turned on, the processing in the flowchart in FIG. 3 is started.

First, in Step S1, the actual-intake-pipe-pressure detection means 11 of the ECU 10 detects the actual pressure (hereinafter, referred to as actual intake pipe pressure A) in the intake pipe 6 from the actual measured value (detected value) of the intake pipe pressure sensor 7.

Figure 5:
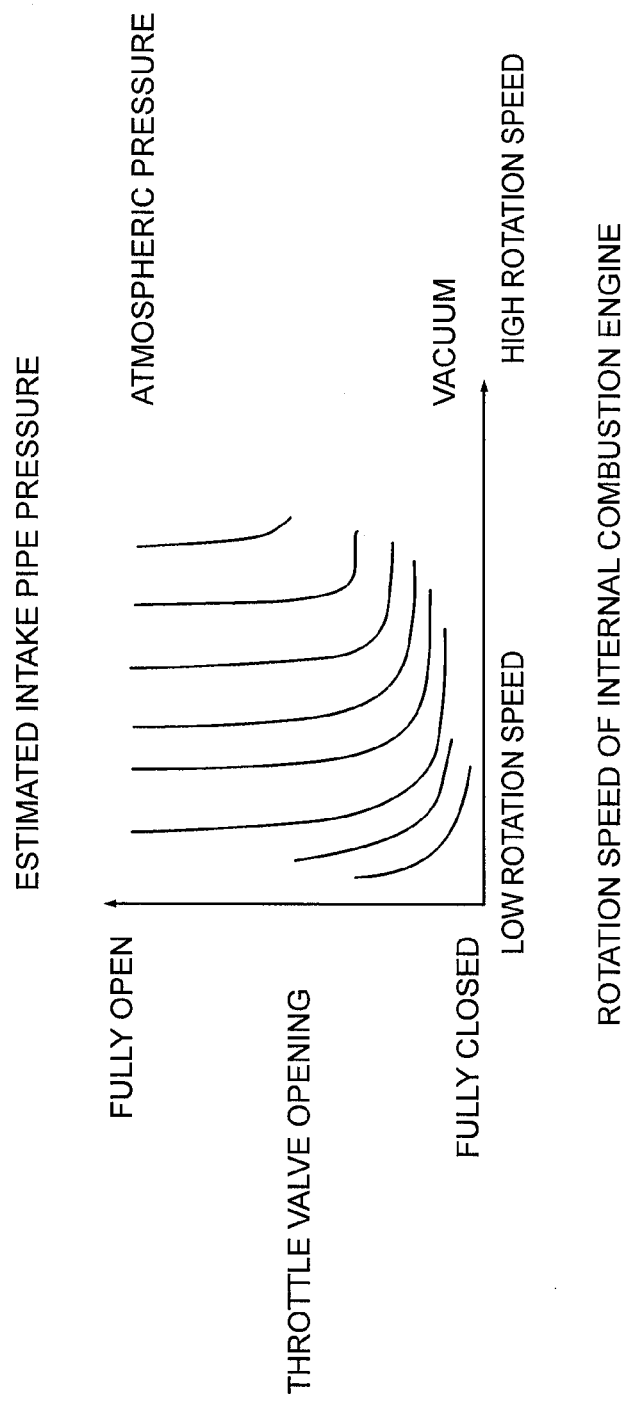
FIG. 5 is a characteristic diagram illustrating an estimated intake pipe pressure of the pumping brake detection and control device for an internal combustion engine according to the first embodiment of the present invention.

In Step S2, the estimated-intake-pipe-pressure detection means 12 of the ECU 10 calculates the estimated value of the pressure in the intake pipe 6 based on the rotation speed of the internal combustion engine 1 detected by the rotation speed sensor 8 and the opening degree of the throttle valve 9 detected by the throttle position sensor (not shown). The estimated-intake-pipe-pressure detection means 12 includes a table for determining the estimated value of the pressure in the intake pipe 6 illustrated in FIG. 5. The values of the estimated intake pipe pressure are set in advance in this table in association with the values of the rotation speed of the internal combustion engine 1 and the values of the opening degree of the throttle valve 9. Note that, respective solid lines in the graph of FIG. 5 denote "estimated intake pipe pressures", and the state thereof is represented with respect to "ATMOSPHERE (side)" and "VACUUM (side)". Eight solid lines in the graph in FIG. 5 respectively represent "estimated intake pipe pressures" for certain air quantities (g/sec), which are (constant) air quantities: "10 g/sec" (at the left end), "20 g/sec", "30 g/sec", "40 g/sec", "50 g/sec", "60 g/sec", "70 g/sec", and "80 g/sec" (at the right end) arranged sequentially in the ascending order from the left to the right. The air quantity and the intake pipe pressure are mutually related with each other, and the estimated intake pipe pressure is on the atmospheric pressure side if the engine speed is low, and is on the vacuum side if the engine speed is high for the air quantity 30 g/sec (constant), for example. Moreover, the estimated intake pipe pressure is on the atmospheric pressure side if the throttle valve opening degree is high, and the estimated intake pipe pressure is on the vacuum side if the throttle valve opening degree is low for the same condition (air quantity: 30 g/sec (constant)). The same tendency holds true for the other air quantities (constant) as represented by the respective solid lines in the graph of FIG. 5. A value of the estimated intake pipe pressure can be uniquely determined in this way according to a value of the rotation speed of the internal combustion engine 1 and a value of the opening degree of the throttle valve 9 referring to the table in FIG. 5. The estimated-intake-pipe-pressure detection means 12 uses this table to calculate an estimated value of the pressure (hereinafter, referred to as estimated intake pipe pressure B) in the intake pipe 6 according to the rotation speed of the internal combustion engine 1 and the opening degree of the throttle valve 9.

Then, in Step S3, the pressure difference calculation means 13 of the ECU 10 calculates the pressure difference C between the actual intake pipe pressure A and the estimated intake pipe pressure B according to the following equation (1). This information is stored in the RAM 10a.

$$(\text{Pressure difference } C) = (\text{Actual intake pipe pressure } A) - (\text{Estimated intake pipe pressure } B) \quad (1)$$

Then, in Step S4, the pressure difference integration means 14 of the ECU 10 integrates the pressure difference C for a certain period t (period from a time point t1 to a time point t2) according to the following equation (2), thereby calculating a value of integral D. The constant period t is a period of one rotation of the internal combustion engine 1, for example.

$$D = \int_{t1}^{t2} C(t) dt \quad (2)$$

Then, in Step S5, the pumping brake detection means 15 of the ECU 10 detects whether or not the value of integral D acquired in Step S4 is equal to or more than a determination value N1. If the value of integral D is equal to or more than the determination value N1, the processing proceeds to Step S7. In Step S7, the pumping brake detection means 15 determines that the pumping brake operation has started, and the processing proceeds to Step S10. On this occasion, the determination value N1 is set in advance based on the minimum value of the negative pressure required to drive the brake booster 3.

On the other hand, if in Step S5 the pumping brake detection means 15 determines that the value of integral D is less than the determination value N1, the processing proceeds to Step S6.

In Step S6, the pumping brake detection means 15 of the ECU 10 detects whether the value of integral D acquired in Step S4 is less than a determination value N2, and if the value of integral D is less than the determination value N2, the pumping brake detection means 15 determines that the pumping brake operation has been finished in Step S8, and the processing proceeds to Step S10. The determination value N2 is set to a value obtained by setting a hysteresis to the determination value N1 (value set to 80% of the determination value N1, for example) on this occasion. The determination value N2 is thus smaller than the determination value N1.

On the other hand, if the pumping brake detection means 15 determines in Step S6 that the value of integral D is equal to or more than the determination value N2, the processing proceeds to Step S9 in which the pumping brake detection means 15 determines that the pumping brake operation is being carried out, and the processing proceeds to Step S10.

If the pumping brake detection means 15 has determined in Step S10 that the pumping brake has started (Step S7), or that the pumping brake operation is being carried out (Step S9), the processing proceeds to Step S11, in which the throttle valve control means 16 carries out the throttle valve control for the pumping brake period. In other words, the throttle valve control means 16 provides control of closing the throttle valve 9 by an amount of the pressure corresponding to an air quantity which has flown from the brake booster 3 to the intake pipe 6, thereby securing a negative pressure for driving the brake booster 3. On the other hand, if it has been determined in Step S10 that the pumping brake operation is not being carried out (Step S8), the throttle valve control means 16 provides the ordinary throttle valve control in Step S12.

As described above, the pumping brake detection means 15 determines that the pumping brake operation has been started if the value of integral D calculated by the pressure difference integration means 14 is equal to or more than the determination value N1, determines that the pumping brake operation is being carried out until the value of integral D becomes less than the determination value N2, and determines that the pumping brake operation has been finished if the value of integral D becomes less than the determination value N2.

Figure 4:
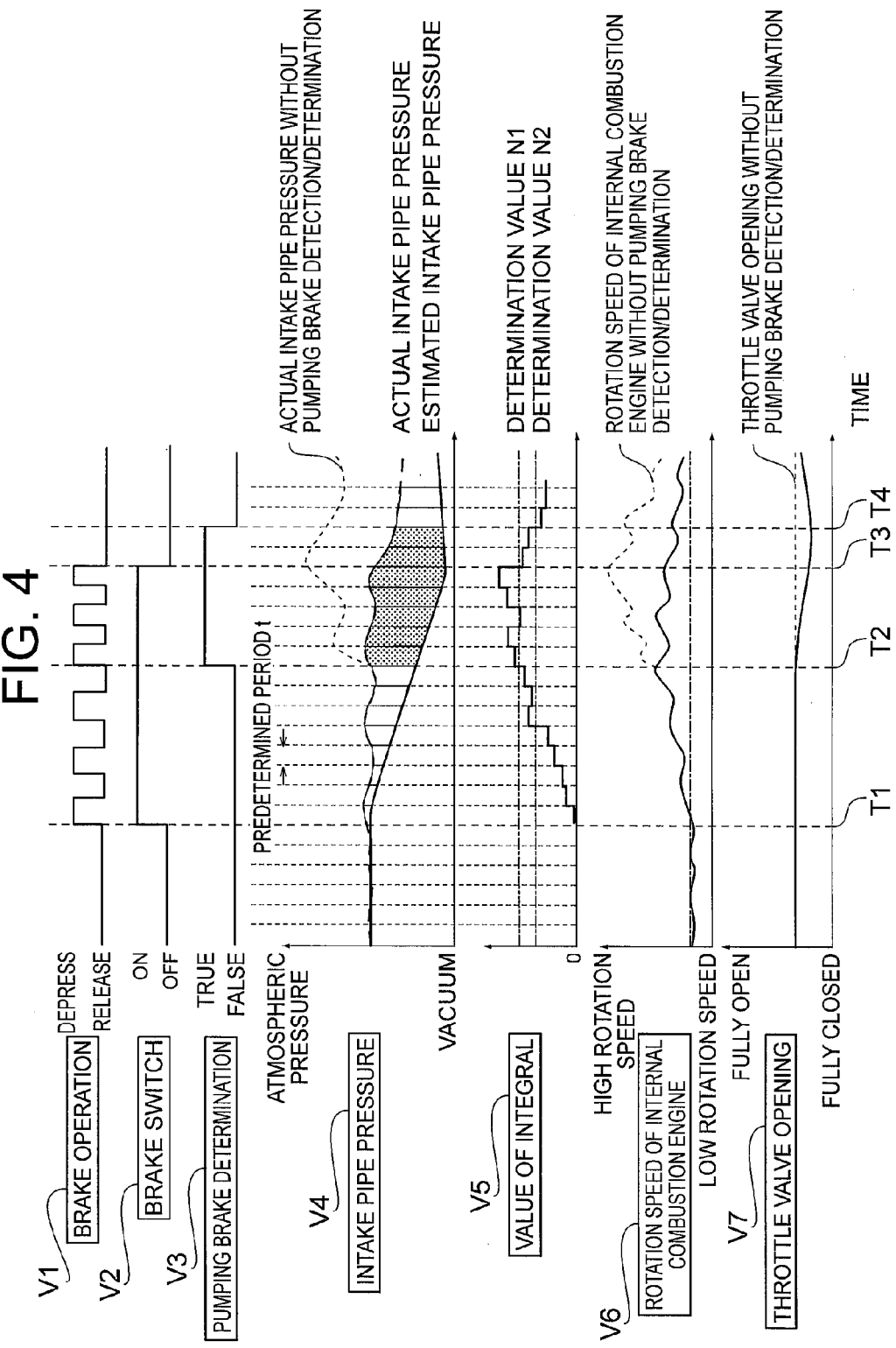
FIG. 4 is a timing chart illustrating an operation state of the pumping brake detection and control device for an internal combustion engine according to the first embodiment of the present invention.

FIG. 4 is a time chart corresponding to the above-mentioned description while the horizontal axis is set to time. In FIG. 4, reference symbol V1 denotes the brake operation by the driver; V2 denotes the state of the brake switch 2a; V3 denotes the pumping brake determination; V4 denotes the pressures in the intake pipe 6 (actual pressure and estimated value); V5 denotes the value of integral by the pressure difference integration means 14; V6 denotes the rotation speed of the internal combustion engine 1; and V7 denotes the opening degree of the throttle valve 9.

The brake operation (V1) represents the depressing operation on the brake pedal 2 by the driver. According to the brake operation (V1), the pumping brake operation starts at a timing T1, and the pumping brake operation finishes at a timing T3. During the pumping brake operation period (section from the timing T1 to the timing T3), "DEPRESS" of the brake operation (V1) in FIG. 4 represents the case in which the driver depresses the brake pedal 2 exceeding R103 illustrated in FIG. 2, and "RELEASE" in FIG. 4 represents the case in which the driver decreases the depression force on the brake pedal 2 so that R102 illustrated in FIG. 2 is attained. However, in a period other than the pumping brake operation period (namely, before the timing T1 or after the timing T3), "RELEASE" is a case in which the depression quantity of the brake pedal 2 is less than R101.

The brake switch (V2) represents the state of the brake switch 2a illustrated in FIG. 2 in response to the brake operation (V1). The ON state remains during the pumping brake operation period (section from the timing T1 to T3).

The intake pipe pressures (V4) represent the value of the actual intake pipe pressure and the value of the estimated intake pipe pressure. The air flows from the brake booster 3 to the intake pipe 6 in response to the depression quantity of the brake pedal 2 represented by the brake operation (V1), and the actual intake pipe pressure in the intake pipe 6 thus increases toward the atmospheric pressure side. On the other hand, as to the estimated intake pipe pressure in the intake pipe 6, since the pressure in the intake pipe 6 increases, the rotation speed (V6) of the internal combustion engine 1 increases. Thus, the estimated intake pipe pressure in the intake pipe 6 decreases toward the vacuum side in accordance with the table of FIG. 5.

The value of integral (V5) is the result of the integration of the pressure difference between the value of the actual intake pipe pressure and the value of the estimated intake pipe pressure of the intake pipe pressures (V4) in the predetermined period t determined by the rotation speed of the internal combustion engine 1.

Regarding the pumping brake determination (V3), the determination of the pumping brake is true when the value of integral (V5) becomes equal to or more than the determination value N1 (timing T2), and the determination of the pumping brake is false when the value of integral (V5) becomes less than the determination value N2 (timing T4).

The throttle valve opening degree (V7) represents that the negative pressure is secured for the brake booster 3 by providing control to close the throttle valve 9 by an amount of the pressure corresponding to an air quantity which has flown from the brake booster 3 to the intake pipe 6 when the pumping brake determination (V3) is true (timing T2). When the pumping brake determination (V3) is false (timing T4), the ordinary throttle valve opening control is applied to the throttle valve 9.

Thus, according to this embodiment, the pumping brake can be detected for any brake operation, and the negative pressure required for driving the brake booster 3 can be secured.

As described above, the pumping brake detection and control device for an internal combustion engine according to the present invention includes: the actual-intake-pipe-pressure detection means 11 for detecting the actual intake pipe pressure of the intake pipe 6 for supplying the internal combustion engine 1 with air based on the detected value detected by the intake pipe pressure sensor 7; the estimated-intake-pipe-pressure detection means 12 for calculating the estimated intake pipe pressure based on the rotation speed of the internal combustion engine 1 and the opening degree of the throttle valve 9 provided in the intake pipe; the pressure difference calculation means 13 for calculating the pressure difference between the actual intake pipe pressure detected by the actual-intake-pipe-pressure detection means 11 and the estimated intake pipe pressure calculated by the estimated-intake-pipe-pressure detection means 12; the pressure difference integration means 14 for integrating the pressure difference calculated by the pressure difference calculation means 13 with respect to time; the pumping brake detection means 15 for determining that the pumping brake operation is started when the value of integral D calculated by the pressure difference integration means 14 becomes equal to or more than the first determination value N1, and then determining that the pumping brake operation is finished when the value of integral D becomes less than the second determination value N2 smaller than the first determination value N1; and the throttle valve control means 16 for carrying out, on the throttle valve, control for the pumping brake period during the pumping brake operation based on a result of the determination by the pumping brake detection means, and carrying out ordinary control otherwise. The pumping brake detection and control device for an internal combustion engine integrates the difference between the estimated intake pipe pressure based on the rotation speed of the internal combustion engine 1 and the opening degree of the throttle valve 9 and the actual intake pipe pressure, and determines that the pumping brake is being carried out when the value of integral D is equal to or more than the determination value N1. Therefore, the pumping brake is detected for any brake operation, and the brake negative pressure required for driving the brake booster can be secured.

What is claimed is:

1. A pumping brake detection and control device for an internal combustion engine, comprising:

actual-intake-pipe-pressure detection means for detecting an actual intake pipe pressure of an intake pipe for supplying an internal combustion engine with air based on a detected value detected by an intake pipe pressure sensor;

estimated-intake-pipe-pressure detection means for calculating an estimated intake pipe pressure based on a rotation speed of the internal combustion engine and an opening degree of a throttle valve provided in the intake pipe;

pressure difference calculation means for calculating a pressure difference between the actual intake pipe pressure detected by the actual-intake-pipe-pressure detection means and the estimated intake pipe pressure calculated by the estimated-intake-pipe-pressure detection means;

pressure difference integration means for integrating the pressure difference calculated by the pressure difference calculation means with respect to time;

pumping brake detection means for determining that a brake operation by a driver is a pumping brake operation when a value of integral calculated by the pressure difference integration means is equal to or more than a predetermined first determination value; and throttle valve control means for carrying out, on the throttle valve, a control for a pumping brake period during the pumping brake operation, and carrying out an ordinary control otherwise, based on a result of the determination by the pumping brake detection means.

2. A pumping brake detection and control device for an internal combustion engine according to claim 1, wherein the pumping brake detection means determines that the pumping brake operation is started when the value of integral calculated by the pressure difference integration means becomes equal to or more than the first determination value, and then determines that the pumping brake operation is finished when the value of integral becomes less than a predetermined second determination value set in advance so as to be smaller than the first determination value.

3. A pumping brake detection and control method for an internal combustion engine, comprising:

an actual-intake-pipe-pressure detection step of detecting an actual intake pipe pressure of an intake pipe for supplying an internal combustion engine with air based on a detected value detected by an intake pipe pressure sensor;

an estimated-intake-pipe-pressure detection step of calculating an estimated intake pipe pressure based on a rotation speed of the internal combustion engine and an opening degree of a throttle valve provided in the intake pipe;

a pressure difference calculation step of calculating by a processor a pressure difference between the actual intake pipe pressure detected in the actual-intake-pipe-pressure detection step and the estimated intake pipe pressure calculated in the estimated-intake-pipe-pressure detection step;

a pressure difference integration step of integrating the pressure difference calculated in the pressure difference calculation step with respect to time;

a pumping brake detection step of determining by the processor that a brake operation by a driver is a pumping brake operation when a value of integral calculated by the pressure difference integration step is equal to or more than a predetermined first determination value; and a throttle valve control step of carrying out, on the throttle valve, a control for a pumping brake period during the pumping brake operation, and carrying out an ordinary control otherwise, based on a result of the determination by the pumping brake detection step.

* * * * *